US012631294B2

(12) United States Patent
Rozputyński et al.

(10) Patent No.: US 12,631,294 B2
(45) Date of Patent: May 19, 2026

(54) LUBRICATION TEST ASSEMBLY AND METHOD FOR MEASURING LUBRICANT FLOW OF A BEARING INNER RING USING A LUBRICATION TEST ASSEMBLY

(71) Applicant: Pratt & Whitney Canada Corp., Longueuil (CA)

(72) Inventors: Tomasz Rozputyński, Hyżne (PL); Maciej Piotrowski, Rzeszów (PL)

(73) Assignee: Pratt & Whitney Canada Corp., Longueuil (CA)

( * ) Notice: Subject to any disclaimer, the term of this patent is extended or adjusted under 35 U.S.C. 154(b) by 309 days.

(21) Appl. No.: 18/420,301

(22) Filed: Jan. 23, 2024

(65) Prior Publication Data

US 2025/0237350 A1 Jul. 24, 2025

(51) Int. Cl.
*F16N 29/00* (2006.01)
*F16C 41/00* (2006.01)

(52) U.S. Cl.
CPC .............. *F16N 29/00* (2013.01); *F16C 41/00* (2013.01); *F16C 2233/00* (2013.01); *F16N 2210/14* (2013.01)

(58) Field of Classification Search
None
See application file for complete search history.

(56) References Cited

U.S. PATENT DOCUMENTS

| | | |
|---|---|---|
| 3,178,928 A | 4/1965 | Howe |
| 11,898,571 B2 * | 2/2024 | Harrison ............... F25B 31/008 |

| | | | |
|---|---|---|---|
| 2003/0213637 A1* | 11/2003 | Moriyama ............. B62M 27/02 | 180/291 |
| 2005/0183888 A1* | 8/2005 | Dick ..................... E21B 10/246 | 175/337 |
| 2018/0180500 A1* | 6/2018 | Hawarden .......... H04B 10/0775 | |

FOREIGN PATENT DOCUMENTS

| | | |
|---|---|---|
| CN | 106525432 B | 10/2022 |
| CN | 113049789 B | 7/2023 |
| CN | 114674235 B | 7/2023 |
| CN | 111289249 B | 3/2025 |
| JP | 2008046064 A | 2/2008 |

OTHER PUBLICATIONS

EP Search Report for EP Patent Application No. 25153657.9 dated Jun. 5, 2025.

* cited by examiner

*Primary Examiner* — Suman K Nath
(74) *Attorney, Agent, or Firm* — Getz Balich LLC

(57) ABSTRACT

A lubrication test assembly includes a housing and a shaft. The housing includes a first body portion and a second body portion. The first body portion and the second body portion form a bearing cavity. The first body portion and the second body portion form a first housing opening and a second housing opening of the bearing cavity. The first housing opening and the second housing opening are disposed at an axis. The first body portion and the second body portion form a plurality of axially distributed lubricant separation walls. The axially distributed lubricant separation walls form and separate a plurality of lubricant channels within the bearing cavity. The first body portion forms a plurality of outlets with each outlet of the plurality of outlets disposed at a respective lubricant channel of the plurality of lubricant channels. The shaft is disposed in the bearing cavity and configured for rotation about the axis.

20 Claims, 9 Drawing Sheets

LUBRICATION TEST ASSEMBLY AND METHOD FOR MEASURING LUBRICANT FLOW OF A BEARING INNER RING USING A LUBRICATION TEST ASSEMBLY

TECHNICAL FIELD

This disclosure relates generally to bearing lubrication test equipment and, more particularly, to assemblies and methods for measuring lubricant flow of a bearing inner ring.

BACKGROUND OF THE ART

Rotational equipment, such as a gas turbine engine for an aircraft propulsion system, may include one or more bearings configured to rotationally support rotational components (e.g., a shaft) of the rotational equipment. In many cases, these bearings may require lubrication during operation of the associated rotational equipment. The lubrication flow characteristics for a bearing can impact the operation and durability of the bearing. Various systems and methods for identifying bearing lubrication flow characteristics are known in the art. While these known systems and methods may be suitable for their intended purposes, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a lubrication test assembly includes a housing and a shaft. The housing includes a first body portion and a second body portion. The first body portion and the second body portion form a bearing cavity. The first body portion and the second body portion form a first housing opening and a second housing opening of the bearing cavity. The first housing opening and the second housing opening are disposed at an axis. The first body portion and the second body portion form a plurality of axially distributed lubricant separation walls. The axially distributed lubricant separation walls form and separate a plurality of lubricant channels within the bearing cavity. The first body portion forms a plurality of outlets with each outlet of the plurality of outlets disposed at a respective lubricant channel of the plurality of lubricant channels. The shaft is disposed in the bearing cavity and configured for rotation about the axis. The shaft includes an outer radial side and an inner radial side. The inner radial side surrounds and forms an internal cavity. The internal cavity includes a shaft opening. The shaft opening is disposed at the second housing opening.

In any of the aspects or embodiments described above and herein, the shaft may extend between and to a first axial shaft end and a second axial shaft end. The first axial shaft end may be disposed at the first housing opening. The second axial shaft end may be disposed at the second housing opening.

In any of the aspects or embodiments described above and herein, the lubrication test assembly may further include a motor operably connected to the shaft. The motor may be configured to drive rotation of the shaft about the axis.

In any of the aspects or embodiments described above and herein, the shaft may further form a plurality of shaft lubrication passages. The plurality of shaft lubrication passages may extend between and to the internal cavity and the outer radial side.

In any of the aspects or embodiments described above and herein, the lubrication test assembly may further include a lubricant injection sub-assembly configured to direct one or more lubricant streams into the internal cavity through the shaft opening and the second housing opening.

In any of the aspects or embodiments described above and herein, the lubrication test assembly may further include a lubricant collection sub-assembly connected in fluid communication with the plurality of outlets.

In any of the aspects or embodiments described above and herein, the lubrication test assembly may further include a plurality of lubricant separation disks. Each lubricant separation disk of the plurality of lubricant separation disks may extend radially between the shaft and a respective lubricant separation wall of the plurality of lubricant separation walls to further form the plurality of lubricant channels within the bearing cavity.

In any of the aspects or embodiments described above and herein, the plurality of lubricant separation disks may be rotationally fixed to the shaft, relative to the axis.

In any of the aspects or embodiments described above and herein, the plurality of lubricant separation disks may include a plurality of inner axial lubricant separation disks and a plurality of outer axial lubricant separation disks. Each inner axial lubricant separation disk of the plurality of inner axial lubricant separation disks may be connected to a respective outer axial lubricant separation disk of the plurality of outer axial lubricant separation disks.

In any of the aspects or embodiments described above and herein, each lubricant channel of the plurality of lubricant channels may extend circumferentially about the axis.

According to another aspect of the present disclosure, a method for measuring lubricant flow of a bearing inner ring using a lubrication test assembly is provided. The method includes installing an inner ring of a bearing on a shaft. The shaft includes an outer radial side and an inner radial side. The inner radial side surrounds and forms an internal cavity and a shaft opening of the internal cavity. The shaft further forms a plurality of shaft lubrication passages. The plurality of shaft lubrication passages extend between and to the internal cavity and the outer radial side. The inner ring is disposed on the outer radial side at the plurality of shaft lubrication passages. The method further includes installing the shaft and the inner ring into a bearing cavity of a housing to form a plurality of separated lubricant channels within the bearing cavity. The housing forms a plurality of outlets with each outlet of the plurality of outlets disposed at a respective lubricant channel of the plurality of separated lubricant channels. The method further includes rotating the shaft and the inner ring, within the bearing cavity, about an axis, directing a lubricant into the internal cavity, while the shaft and the inner ring are rotating, to direct the lubricant through the plurality of shaft lubrication passages, through the inner ring, through the plurality of separated lubricant channels, to the plurality of outlets, separately collecting the lubricant from each outlet of the plurality of outlets, and separately measuring the lubricant collected from each outlet of the plurality of outlets.

In any of the aspects or embodiments described above and herein, separately collecting the lubricant from each outlet of the plurality of outlets may include collecting the lubricant from each outlet of the plurality of outlets with a lubricant collection sub-assembly. The lubricant collection sub-assembly may include a plurality of lubricant collection tanks.

A first lubricant collection tank of the plurality of lubricant collection tanks may be connected in fluid communication with a first outlet of the plurality of outlets and a second lubricant collection tank of the plurality of lubricant collection tanks may be connected in fluid communication with a second outlet of the plurality of outlets.

In any of the aspects or embodiments described above and herein, the inner ring may include a first ring body and a second ring body. Installing the inner ring on the shaft may include positioning an interface of the first ring body and the second ring body at the plurality of shaft lubrication passages.

In any of the aspects or embodiments described above and herein, the first ring body may include a first plurality of ring lubricant passages. The second ring body may include a second plurality of ring lubricant passages. A first lubricant channel of the plurality of separated lubricant channels may be connected in fluid communication with the first plurality of ring lubricant passages. A second lubricant channel of the plurality of separated lubricant channels may be connected in fluid communication with the second plurality of ring lubricant passages. A third lubricant channel of the plurality of separated lubricant channels may be connected in fluid communication with the interface of the first ring body and the second ring body.

In any of the aspects or embodiments described above and herein, installing the inner ring on the shaft may further include installing a plurality of lubrication separator disks on the inner ring and the shaft. The plurality of lubrication separator disks may further form the plurality of separated lubricant channels.

According to another aspect of the present disclosure, an assembly includes a housing, a shaft, and a bearing inner ring. The housing forms a bearing cavity. The housing further forms a first housing opening and a second housing opening of the bearing cavity along an axis. The housing includes a plurality of axially distributed lubricant separation walls. The plurality of axially distributed lubricant separation walls form and separate a plurality of lubricant channels within the bearing cavity. The housing further forms a plurality of outlets with each outlet of the plurality of outlets disposed at a respective lubricant channel of the plurality of lubricant channels. The shaft is disposed in the bearing cavity and configured for rotation about the axis. The shaft includes an outer radial side and an inner radial side. The inner radial side surrounds and forms an internal cavity. The internal cavity includes a shaft opening. The shaft opening is disposed at the second housing opening. The shaft extends between and to first axial shaft end and a second axial shaft end. The first axial shaft end is disposed at the first housing opening. The second axial shaft end is disposed at the second housing opening. The second axial shaft end forms the shaft opening. The shaft further forms a plurality of shaft lubrication passages extending between and to the internal cavity and the outer radial side. The bearing inner ring is mounted on the outer radial side at the plurality of shaft lubrication passages. The bearing inner ring includes a first plurality of ring lubricant passages and a second plurality of ring lubricant passages. The first plurality of ring lubricant passages is connected in fluid communication with a first lubricant channel of the plurality of lubricant channels. The second plurality of ring lubricant passages is connected in fluid communication with a second lubricant channel of the plurality of lubricant channels.

In any of the aspects or embodiments described above and herein, the bearing inner ring may extend between and to an outer radial ring side and an inner radial ring side. The bearing inner ring may form a roller element groove at the outer radial side.

In any of the aspects or embodiments described above and herein, the bearing inner ring may include a first ring body and a second ring body. The first ring body may be disposed axially adjacent the first ring body at an interface. The first ring body and the second ring body may form the roller element groove at the interface.

In any of the aspects or embodiments described above and herein, the interface may be connected in fluid communication with a third lubricant channel of the plurality of lubricant channels.

In any of the aspects or embodiments described above and herein, the assembly may further include a lubricant collection sub-assembly connected in fluid communication with the plurality of outlets. The lubricant collection sub-assembly may include a plurality of lubricant collection tanks. Each lubricant collection tank of the plurality of lubricant collection tanks may be connected in fluid communication with a respective outlet of the plurality of outlets.

The present disclosure, and all its aspects, embodiments and advantages associated therewith will become more readily apparent in view of the detailed description provided below, including the accompanying drawings.

DETAILED DESCRIPTION

Figure 1:
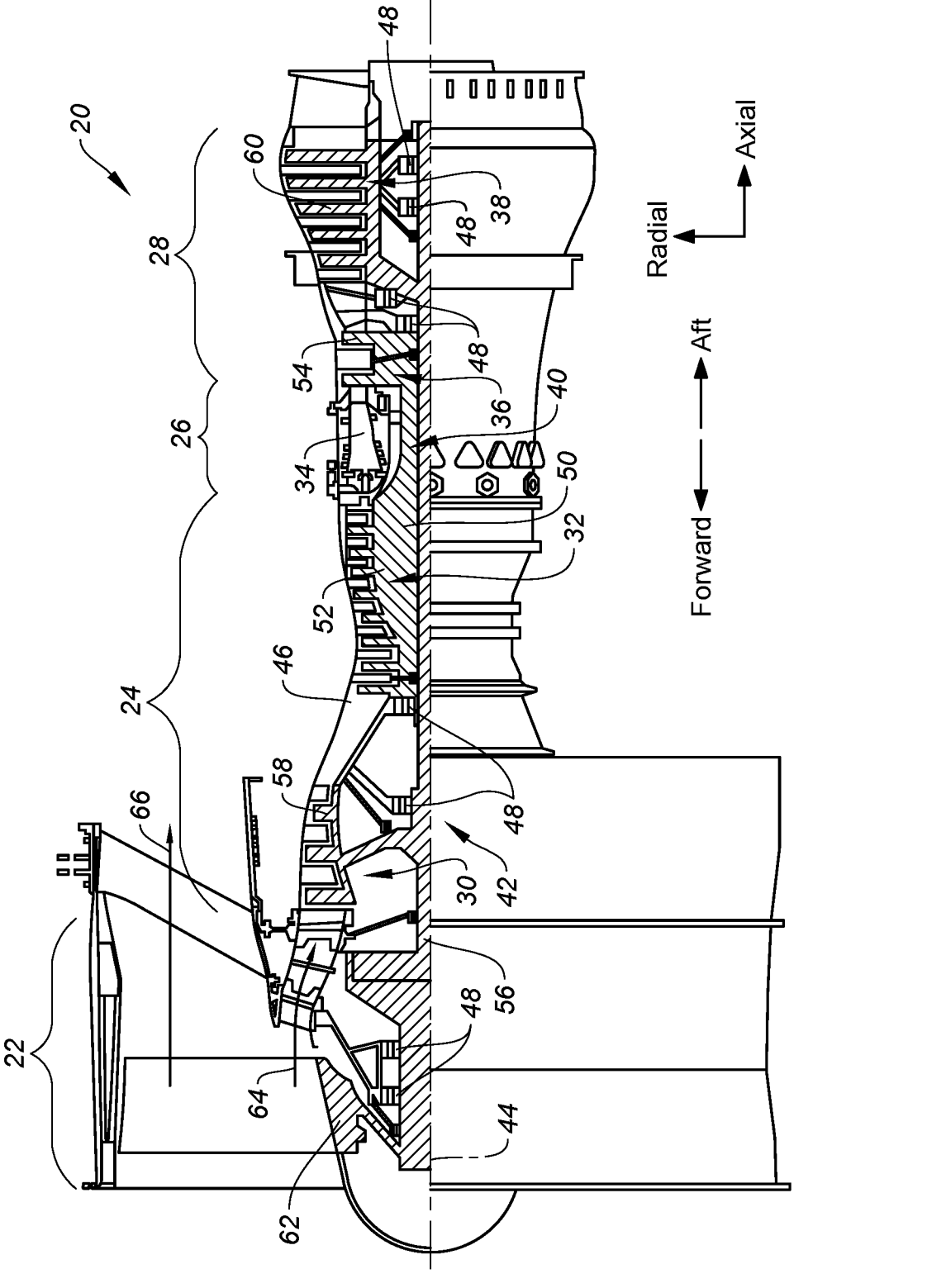
FIG. 1 schematically illustrates a side, cutaway view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for an aircraft propulsion system. However, while the following description and accompanying drawings may refer to the turbofan gas turbine engine of FIG. 1 as an example, it should be understood that aspects of the present disclosure may be equally applicable to components of other types of gas turbine engines including, but not limited to, a turboshaft gas turbine engine, a turboprop gas turbine engine, a turbojet gas turbine engine, a propfan gas turbine engine, or an open rotor gas turbine engine. Aspects of the present disclosure may also be equally applicable to other configurations of rotational equipment such as, but not limited to, an industrial gas turbine engine, a wind turbine, a water turbine, or any other rotational equipment.

The gas turbine engine 20 of FIG. 1 includes a fan section 22, a compressor section 24, a combustor section 26, and a turbine section 28. For example, the compressor section 24 of FIG. 1 includes a low-pressure compressor (LPC) 30 and a high-pressure compressor (HPC) 32, the combustor section 16 includes a combustor 34 (e.g., an annular combustor), and the turbine section 28 includes a high-pressure turbine (HPT) 36 and a low-pressure turbine (LPT) 38.

The gas turbine engine 20 sections 22, 26, 28 form a first rotational assembly 40 (e.g., a high-pressure spool) and a second rotational assembly 42 (e.g., a low-pressure spool) of the gas turbine engine 20. The first rotational assembly 40 and the second rotational assembly 42 are mounted for rotation about a rotational axis 44 (e.g., an axial centerline of the gas turbine engine 20) relative to an engine static structure 46 of the gas turbine engine 20. The engine static structure 46 may include one or more engine cases, cowlings, bearing assemblies, and/or other non-rotating structures configured to house and/or support components of the gas turbine engine 20 sections 22, 24, 26, 28. The engine static structure 46 includes one or more bearing assemblies 48 for rotationally supporting components of the first rotational assembly 40 and/or the second rotational assembly 42.

The first rotational assembly 40 includes a first shaft 50, a bladed first compressor rotor 52 for the high-pressure compressor 32, and a bladed first turbine rotor 54 for the high-pressure turbine 36. The first shaft 50 interconnects the bladed first compressor rotor 52 and the bladed first turbine rotor 54.

The second rotational assembly 42 includes a second shaft 56, a bladed second compressor rotor 58 for the low-pressure compressor 30, and a bladed second turbine rotor 60 for the low-pressure turbine 38. The second shaft 56 interconnects the bladed second compressor rotor 58 and the bladed second turbine rotor 60. The second shaft 56 of FIG. 1 additionally interconnects the bladed second compressor rotor 58 and the bladed second turbine rotor 60 with a bladed fan rotor 62 for the fan section 22. The second shaft 56 may alternatively be coupled to the bladed fan rotor 62 (e.g., an input shaft of the bladed fan rotor 62) by a reduction gear assembly configured to drive the bladed fan rotor 62 at a different (e.g., reduced) rotational speed relative to the second shaft 56.

In operation of the gas turbine engine 20 of FIG. 1, ambient air is directed through the fan section 22 and into a core flow path 64 and a bypass flow path 66 by rotation of the bladed fan rotor 62. Airflow along the core flow path 64 is compressed by the low-pressure compressor 30 and the high-pressure compressor 32, mixed and burned with fuel in the combustor 34, and then directed through the high-pressure turbine 36 and the low-pressure turbine 38. The bladed first turbine rotor 54 and the bladed second turbine rotor 60 rotationally drive the first rotational assembly 40 and the second rotational assembly 42, respectively, in response to the combustion gas flow through the high-pressure turbine 36 and the low-pressure turbine 38. The first shaft 50 and the second shaft 56 are concentric and rotate about the rotational axis 44. The present disclosure, however, is not limited to concentric configurations of the first shaft 50 and the second shaft 56 and the first shaft 50 and the second shaft 56 may alternatively be configured for rotation about discrete rotational axes.

Figure 2:
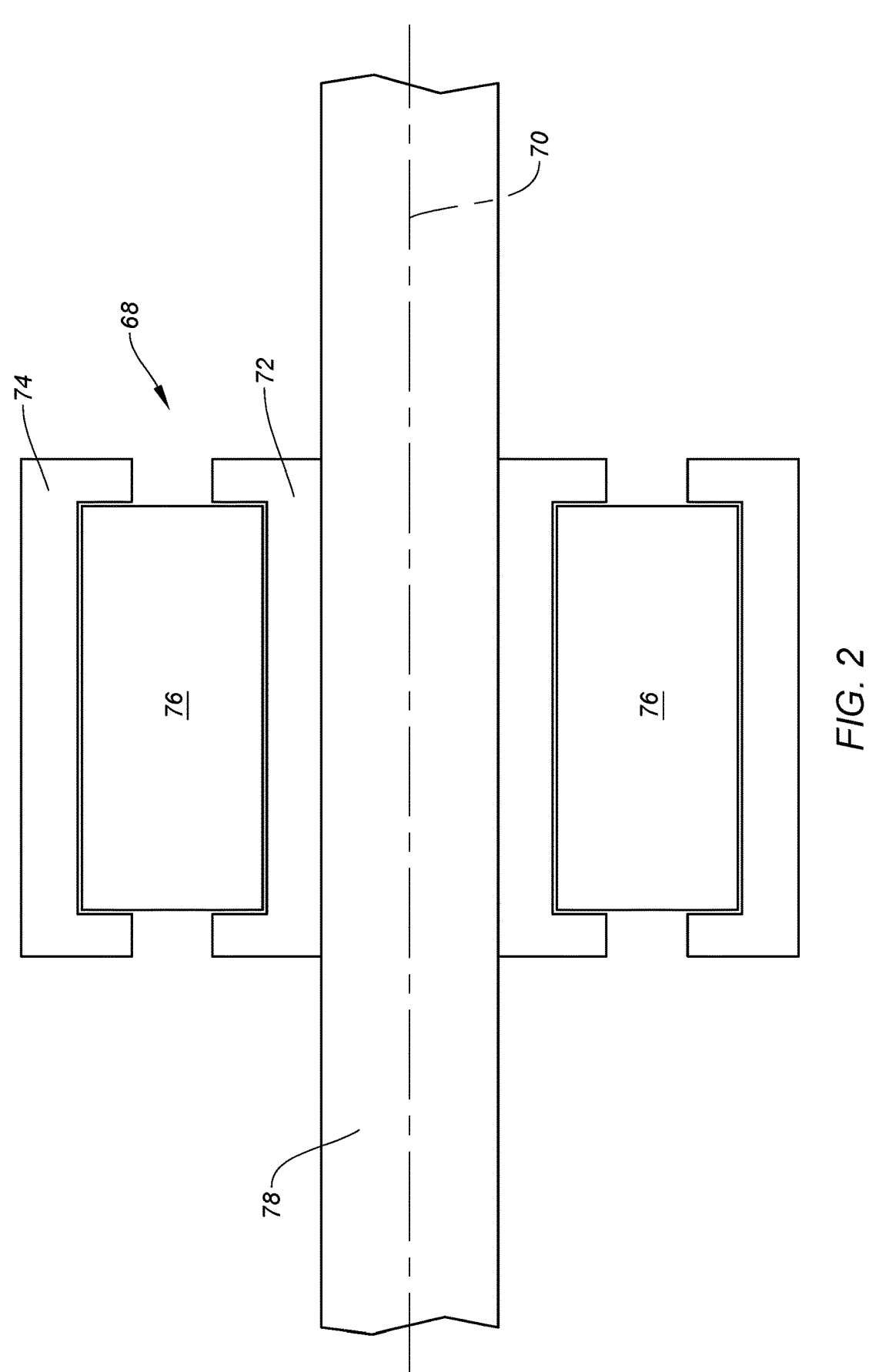
FIG. 2 schematically illustrates a side, cutaway view of a bearing for the gas turbine engine of FIG. 1, in accordance with one or more embodiments of the present disclosure.

FIG. 2 illustrates a side, cutaway view of an exemplary configuration of a bearing 68 for one of the bearing assemblies 48. The bearing 68 of FIG. 2 extends circumferentially about an axial centerline 70 (e.g., the rotational axis 44). The bearing includes an inner ring 72 (also known as an "inner race"), an outer ring 74 (also known as an "outer race"), and a plurality of roller elements 76. The inner ring 72 and the outer ring 74 extend circumferentially about (e.g., completely around) the axial centerline 70. The outer ring 74 is disposed radially outward of the inner ring 72. The roller elements 76 are disposed radially between and constrained by the inner ring 72 and the outer ring 74. As shown in FIG. 2, the inner ring 72 may be mounted on (e.g., fixedly mounted to) a rotatable shaft 78 (e.g., the first shaft 50 or the second shaft 56). The outer ring 74 may be mounted on (e.g., fixedly mounted to) a case or other structure of the engine static structure 46. The roller elements 76 of FIG. 2 are configured as cylindrical roller elements, however, the present disclosure is not limited to this foregoing exemplary configuration of the roller elements 76. For example, the roller elements 76 may alternatively be ball roller elements, spherical roller elements, tapered roller elements, needle roller elements, etc.

Figure 3A:
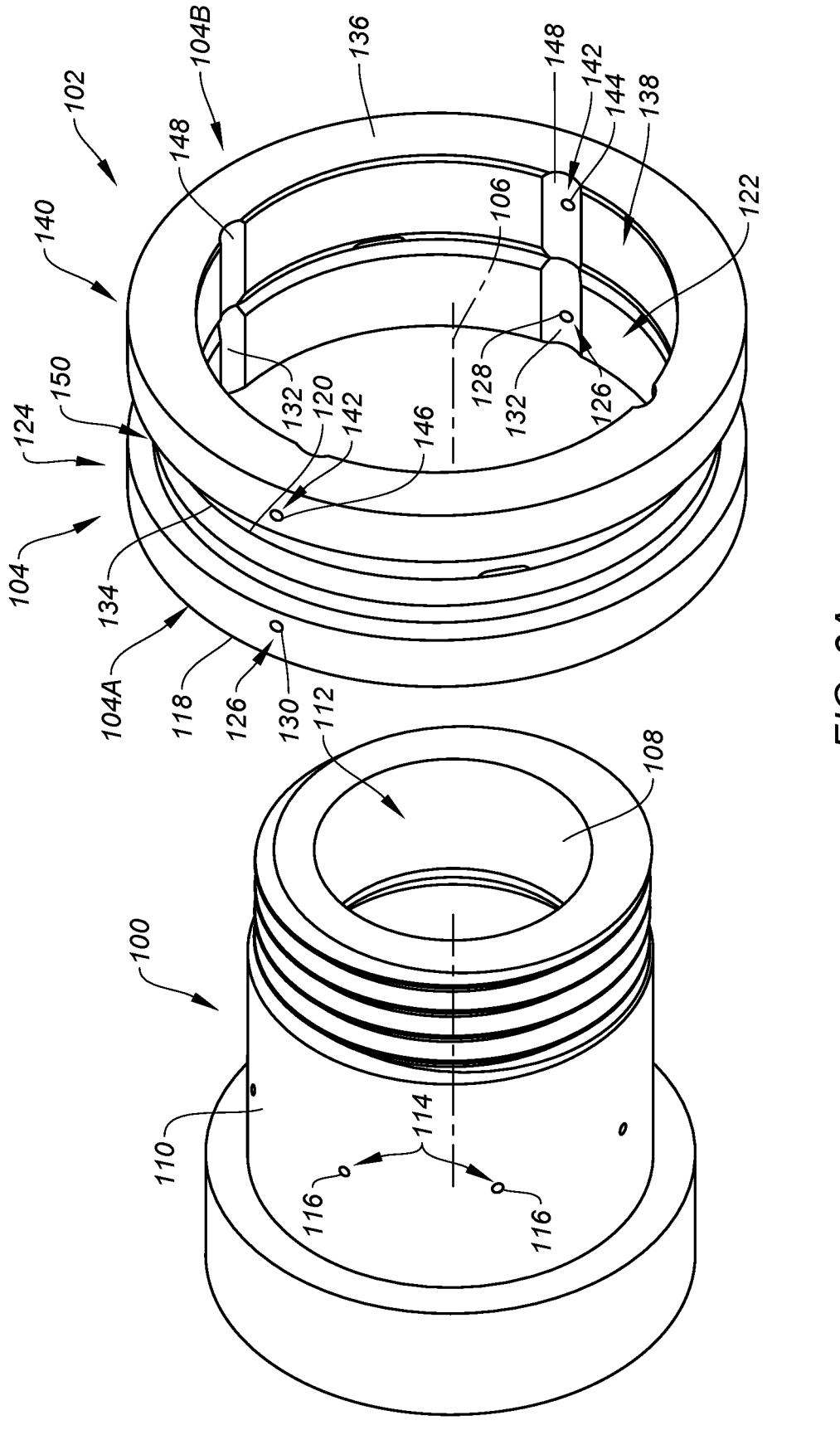
FIGS. 3A and 3B illustrate perspective views of a shaft and different configurations of an inner ring for a bearing, in accordance with one or more embodiments of the present disclosure.
Figure 3B:
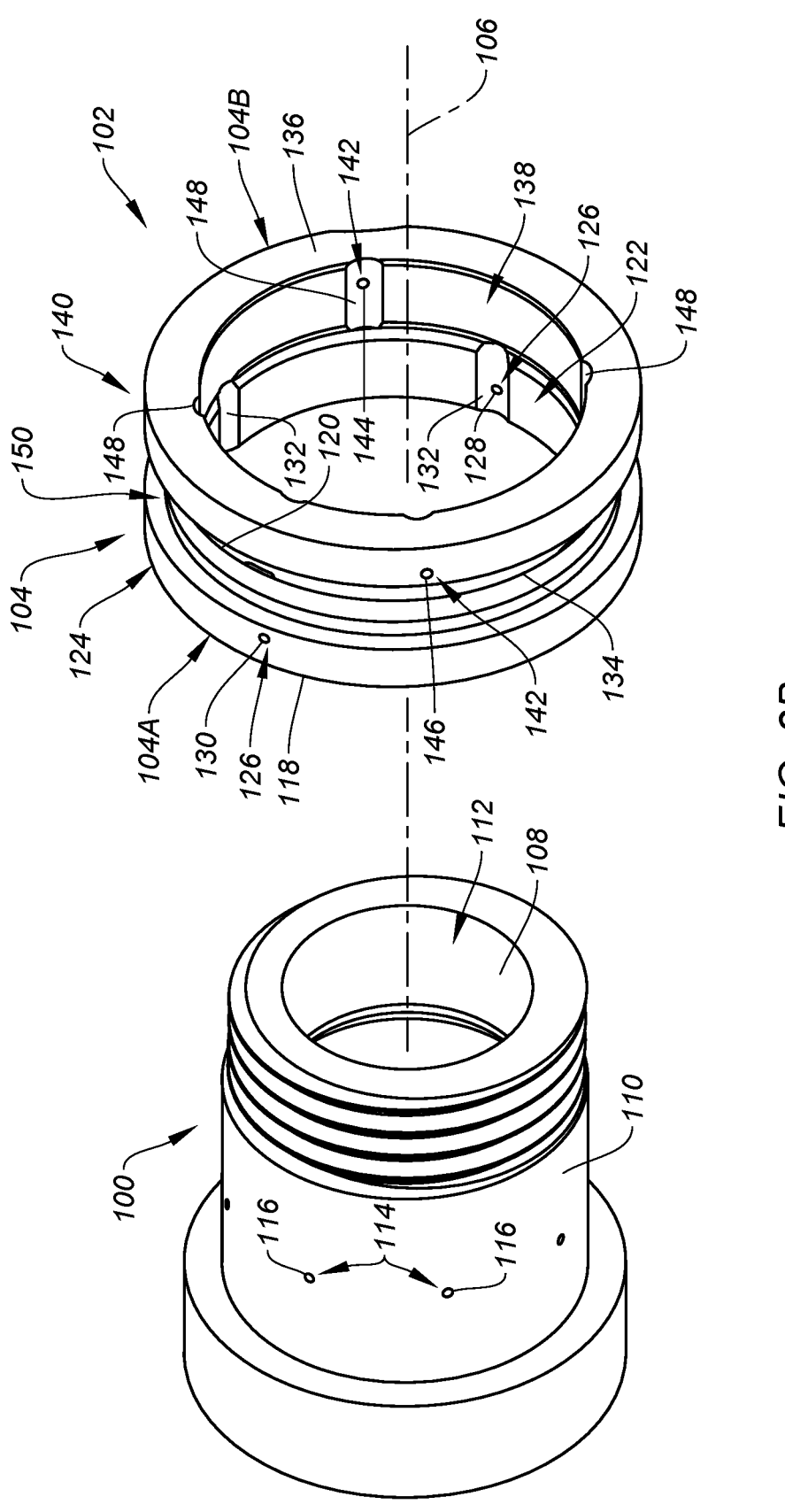

FIGS. 3A and 3B illustrate perspective views of a portion of a rotatable shaft 100 for rotational equipment and a bearing 102 including an inner ring 104. The bearing 102 may be the same as or similar to those of the bearing assemblies 48 (e.g., the bearing 68). The inner ring 104 is configured to be installed and/or mounted on the shaft 100. The shaft 100 and the inner ring 104 extend circumferentially about (e.g., completely around) an axial centerline 106, which axial centerline 106 is a rotational axis of the shaft 100.

The shaft 100 extends between and to an inner side 108 (e.g., an inner radial side) of the shaft 100 and an outer side 110 (e.g., an outer radial side) of the shaft 100. The inner side 108 may surround and form an inner cavity 112 of the shaft 100 extending along the axial centerline 106. The shaft 100 forms a plurality of lubrication passages 114 extending through the shaft 100 from the inner side 108 to the outer side 110. The lubrication passages 114 may be distributed circumferentially about the shaft 100. Each of the lubrication passages 114 may include a passage inlet (not shown) at (e.g., on, adjacent, or proximate) the inner side 108 and a passage outlet 116 at (e.g., on, adjacent, or proximate) the outer side 110. In operation, a lubricant (e.g., oil) may be directed into the inner cavity 112 and may flow through the lubrication passages 114 (e.g., from the passage inlet to the passage outlet 116 of each of the lubrication passages 114) to the outer side 110.

The inner ring 104 of FIGS. 3A and 3B includes a first ring body 104A and a second ring body 104B. The first ring body 104A and the second ring body 104B are described herein as discrete structural bodies of the inner ring 104, however, the inner ring 104 may alternative be formed by a unitary structure of the first ring body 104A and the second ring body 104B. The first ring body 104A extends (e.g., axially extends) between and to a first end 118 of the first ring body 104A and a second end 120 of the first ring body 104A. The first ring body 104A extends (e.g., radially extends) between and to an inner side 122 of the first ring body 104A and an outer side 124 of the first ring body 104A. The first ring body 104A forms a plurality of lubrication passages 126 extending through the first ring body 104A from the inner side 122 to the outer side 124. The lubrication passages 126 may be distributed circumferentially about the first ring body 104A. Each of the lubrication passages 126 may include a passage inlet 128 disposed at (e.g., on, adjacent, or proximate) the inner side 122 and a passage outlet 130 disposed at (e.g., on, adjacent, or proximate) the outer side 124. The first ring body 104A may further form a plurality of lubrication grooves 132 at (e.g., on, adjacent, or proximate) the inner side 122. Each of the lubrication grooves 132 may form a recessed portion of the first ring body 104A at (e.g., on, adjacent, or proximate) the inner side 122. Each of the lubrication grooves 132 may extend (e.g., axially extend) between and to the first end 118 and the second end 120. The passage inlet 128 of each of the lubrication passages 126 may be disposed within a respective one of the lubrication grooves 132.

Similarly, the second ring body 104B extends (e.g., axially extends) between and to a first end 134 of the second ring body 104B and a second end 136 of the second ring body 104B. The second ring body 104B extends (e.g., radially extends) between and to an inner side 138 of the second ring body 104B and an outer side 140 of the second ring body 104B. The second ring body 104B forms a plurality of lubrication passages 142 extending through the second ring body 104B from the inner side 138 to the outer side 140. The lubrication passages 142 may be circumferentially distributed about the second ring body 104B. Each of the lubrication passages 142 may include a passage inlet 144 disposed at (e.g., on, adjacent, or proximate) the inner side 138 and a passage outlet 146 disposed at (e.g., on, adjacent, or proximate) the outer side 140. The second ring body 104B may further form a plurality of lubrication grooves 148 at (e.g., on, adjacent, or proximate) the inner side 138. Each of the lubrication grooves 148 may form a recessed portion of the second ring body 104B at (e.g., on, adjacent, or proximate) the inner side 138. Each of the lubrication grooves 148 may extend (e.g., axially extend) between and to the first end 134 and the second end 136. The passage inlet 144 of each of the lubrication passages 142 may be disposed within a respective one of the lubrication grooves 148.

The inner ring 104 is installed on and/or mounted to the shaft 100 with the first ring body 104A and the second ring body 104B circumscribing the shaft 100 (e.g., the outer side 110). The first ring body 104A is disposed axially adjacent the second ring body 104B, for example, with the second end 120 disposed at (e.g., on, adjacent, or proximate) the first end 134. The inner ring 104 (e.g., the first ring body 104A and the second ring body 104B) is disposed on the shaft 100 at (e.g., on, adjacent, or proximate) the lubrication passages 114 (e.g., the passage outlet 116 of each of the lubrication passages 114). The first ring body 104A and the second ring body 104B cooperatively form a roller element groove 150 at (e.g., on, adjacent, or proximate) the outer side 124 and the outer side 140, respectively. The roller element groove 150 extends circumferentially about (e.g., completely around) the axial centerline 106 along the second end 120 and the first end 134. The roller element groove 150 is configured to retain a plurality of roller elements, such as the roller elements 76 of FIG. 2. The passage outlet 130 of each of the lubrication passages 126 may be disposed outside of (e.g., axially outside of) the roller element groove 150, for example, at (e.g., on, adjacent, or proximate) the first end 118. Similarly, the passage outlet 146 of each of the lubrication passages 142 may be disposed outside of (e.g., axially outside of) the roller element groove 150, for example, at (e.g., on, adjacent, or proximate) the second end 136.

As shown in FIGS. 3A and 3B, the lubrication passages 126 and/or the lubrication grooves 132 may be disposed at various circumferential positions relative to the lubrication passages 142 and/or the lubrication grooves 148. For example, as shown in FIG. 3A, the lubrication passages 126 and the lubrication grooves 132 may be circumferentially aligned with the lubrication passages 142 and the lubrication grooves 148. Alternatively, as shown in FIG. 3B, the lubrication passages 126 and the lubrication grooves 132 may be circumferentially offset from the lubrication passages 142 and the lubrication grooves 148. The lubrication passages 126 and the lubrication grooves 132 of FIG. 3B are circumferentially offset from the lubrication passages 142 and the lubrication grooves 148 of FIG. 3B by approximately 45 degrees (45°), however, the present disclosure is not limited to any particular circumferentially offset of the lubrication passages 126 and the lubrication grooves 132 from the lubrication passages 142 and the lubrication grooves 148.

During operation, lubrication of bearing roller elements may be crucial for bearing durability. Relative circumferential positions of bearing lubrication passages (e.g., the lubrication passages 126 and the lubrication passages 142; see FIGS. 3A and 3B) may be selected to facilitate tailoring of lubrication flow characteristics for a bearing and its roller elements. However, it can be difficult to determine how the lubrication flow characteristics for a particular bearing configuration will be impacted by particular relative circumferential positions of bearing lubrication passages.

Figure 4:
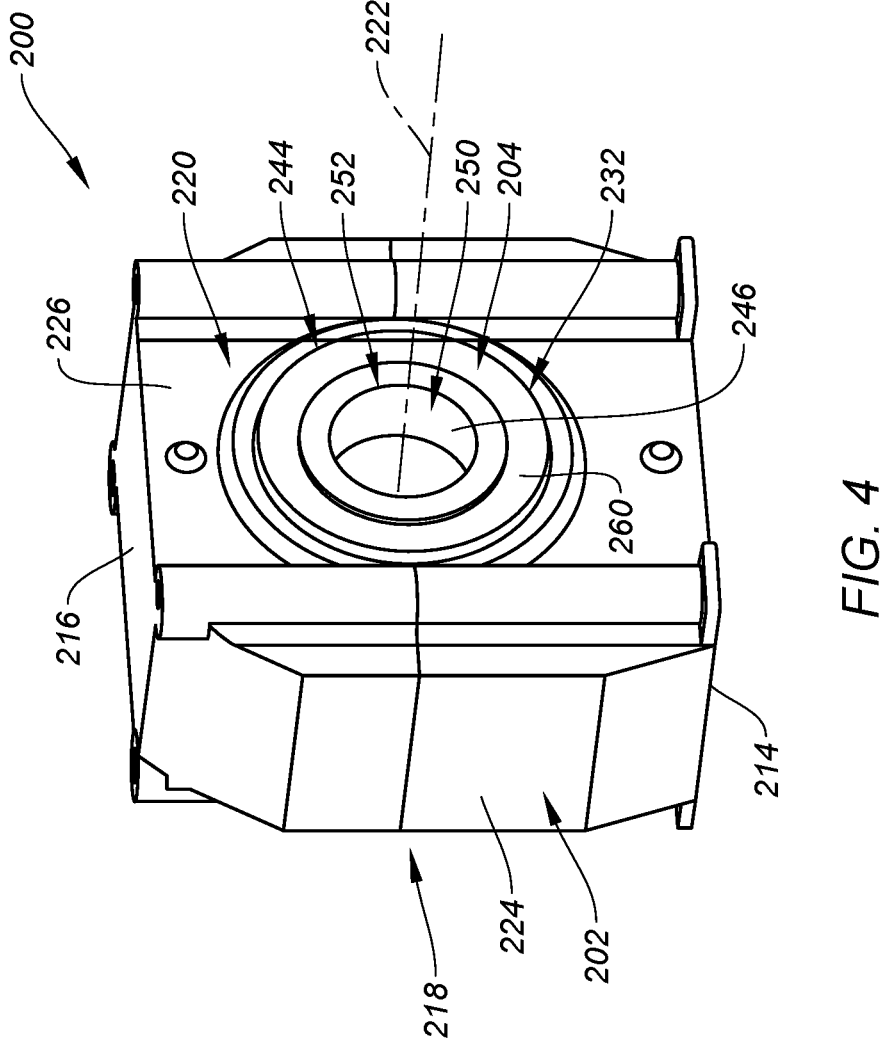
FIG. 4 illustrates a perspective view of a portion of a lubrication test assembly for the inner ring of FIGS. 3A and 3B, in accordance with one or more embodiments of the present disclosure.
Figure 5:
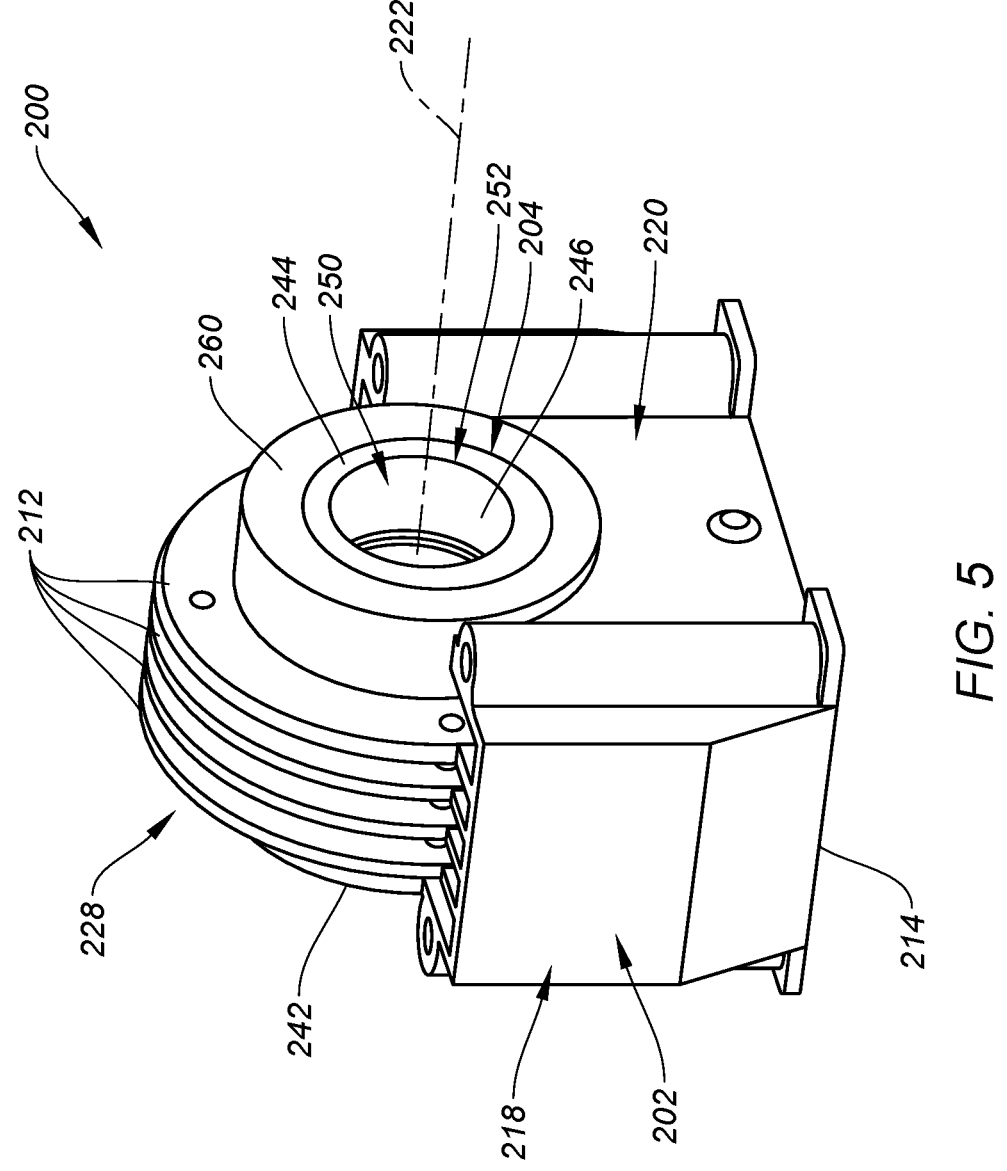
FIG. 5 illustrates another perspective view of a portion of the lubrication test assembly, in accordance with one or more embodiments of the present disclosure.
Figure 6:
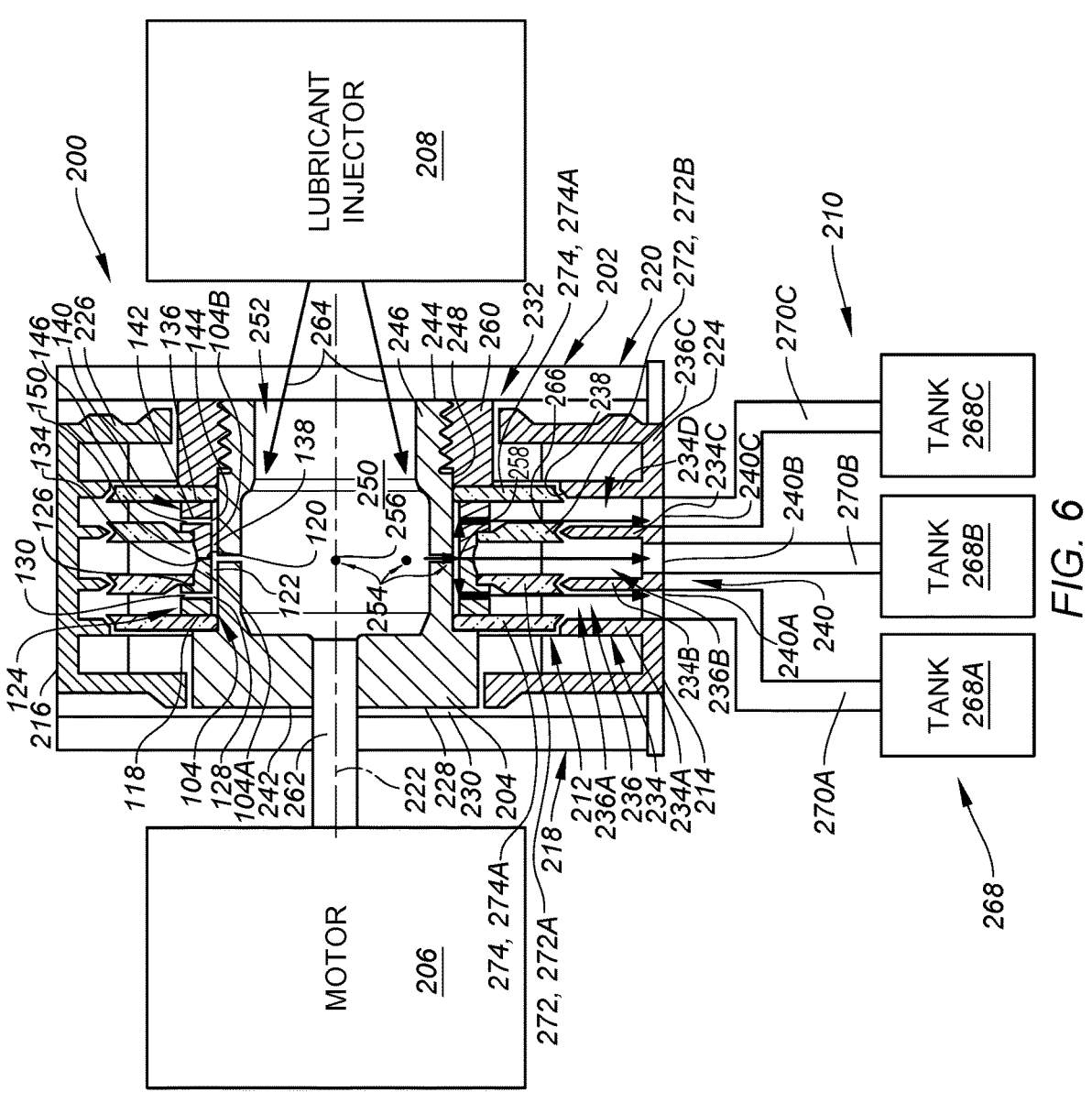
FIG. 6 schematically illustrates a side, cutaway view of the lubrication test assembly, in accordance with one or more embodiments of the present disclosure.

FIGS. 4-6 illustrate a bearing ring lubrication test assembly 200 with the inner ring 104 (e.g., the first ring body 104A and the second ring body 104B) installed in the lubrication test assembly 200. The lubrication test assembly 200 includes a housing 202, a shaft 204, a motor 206, a lubricant injection sub-assembly 208, and a lubricant collection sub-assembly 210. The lubrication test assembly 200 may further include one or more lubricant separation disks 212.

The housing 202 forms an exterior of the lubrication test assembly 200. The housing 202 extends between and to a bottom side 214 (e.g., a base) of the housing 202 and a top side 216 of the housing 202. The housing 202 extends between and to a first end 218 of the housing 202 and a second end 220 of the housing 202. The first end 218 and the second end 220 extend between and to the bottom side 214 and the top side 216. The housing 202 is disposed along an axis 222 extending through the first end 218 and the second end 220.

The housing 202 is formed by a first housing body 224 and a second housing body 226. The first housing body 224 forms the bottom side 214 and portions of the first end 218 and the second end 220 at (e.g., on, adjacent, or proximate) the bottom side 214. The second housing body 226 forms the top side 216 and portions of the first end 218 and the second end 220 at (e.g., on, adjacent, or proximate) the top side 216. The first housing body 224 and the second housing body 226 cooperatively form a bearing cavity 228. The bearing cavity 228 extends through the housing 202 along the axis 222. The first housing body 224 and the second housing body 226 cooperatively form a first opening 230 and a second opening 232 of the bearing cavity 228. The first housing body 224 and the second housing body 226 form the first opening 230 at (e.g., on, adjacent, or proximate) and through the first end 218. The first housing body 224 and the second housing body 226 form the second opening 232 at (e.g., on, adjacent, or proximate) and through the second end 220. Each of the first opening 230 and the second opening 232 may be a circular opening centered about the axis 222. The first housing body 224 and the second housing body 226 may be selectively fixedly mounted together (e.g., by one or more mechanical fasteners) or separated from one another to facilitate access to the bearing cavity 228.

The first housing body 224 and the second housing body 226 form a plurality of lubricant separation walls 234 at (e.g., on, adjacent, or proximate) an outer radial perimeter of the bearing cavity 228. For example, the lubricant separation walls 234 of FIG. 5 include, sequentially in an axial direction from the first end 218 to the second end 220, a first lubricant separation wall 234A, a second lubricant separation wall 234B, a third lubricant separation wall 234C, and a fourth lubricant separation wall 234D. The lubricant separation walls 234 are axially distributed to form and separate (e.g., axially separate) a plurality of lubricant channels 236, for example, between each pair of axially adjacent lubricant separation walls 234. For example, the lubricant channels 236 of FIG. 5 include, sequentially in an axial direction from the first end 218 to the second end 220, a first lubricant channel 236A, a second lubricant channel 236B, and a third lubricant channel 236C. Each of the lubricant separation walls 234 extends circumferentially about (e.g., completely around) the axis 222. Each of the lubricant separation walls 234 extends radially inward to a distal end 238 of the respective one of the lubricant separation walls 234. As shown in FIG. 5, for example, a radial height of the lubricant separation walls 234 may vary in the circumferential direction. The first housing body 224 and/or the second housing body 226 may form at least one outlet 240 for each of the lubricant channels 236. For example, the first housing body 224 of FIG. 5 forms a first outlet 240A for the first lubricant channel 236A, a second outlet 240B for the second lubricant channel 236B, and a third outlet 240C for the third lubricant channel 236C. Each of the outlets 240 of FIG. 5 extends between and to a respective one of the lubricant channels 236 and the bottom side 214.

The shaft 204 extends between and to a first end 242 of the shaft 204 and a second end 244 of the shaft 204. The shaft 204 extends between and to an inner side 246 of the shaft 204 and an outer side 248 of the shaft 204. The inner side 246 and the outer side 248 may extend circumferentially about (e.g., completely around) the axis 222. The inner side 246 surrounds and forms an internal cavity 250 of the shaft 204. The internal cavity 250 may include an opening 252 at (e.g., on, adjacent, or proximate) the second end 244. The internal cavity 250 may be enclosed or partially enclosed by the shaft 204 at (e.g., on, adjacent, or proximate) the first end 242. The shaft 204 forms a plurality of lubrication passages 254 extending through the shaft 204 from the inner side 246 to the outer side 248. The lubrication passages 254 may be distributed circumferentially about the shaft 204. Each of the lubrication passages 254 may include a passage inlet 256 at (e.g., on, adjacent, or proximate) the inner side 246 and a passage outlet 258 at (e.g., on, adjacent, or proximate) the outer side 248. The shaft 204 is positioned in the bearing cavity 228 as shown, for example, in FIGS. 4-6. The shaft 204 may be positioned with the first end 242 at (e.g., on, adjacent, or proximate) the first end 218 and the first opening 230 and/or with the second end 244 at (e.g., on, adjacent, or proximate) the second end 220 and the second opening 232. The shaft 204 may contact the first housing body 224 and/or the second housing body 226 at (e.g., on, adjacent, or proximate) the first opening 230.

The inner ring 104 is installed on and/or mounted to the shaft 204 (e.g., the outer side 248) with the first ring body 104A and the second ring body 104B circumscribing the shaft 204 (e.g., the outer side 248). The first ring body 104A is disposed axially adjacent the second ring body 104B, for example, with the second end 120 disposed at (e.g., on, adjacent, or proximate) the first end 134. The inner ring 104 (e.g., the first ring body 104A and the second ring body 104B) is disposed on the shaft 204 at (e.g., on, adjacent, or proximate) the lubrication passages 254 (e.g., the passage outlet 258 of each of the lubrication passages 254). For example, the inner ring 104 may be positioned on the shaft 204 with the passage outlet 258 of each of the lubrication passages 254 disposed at (e.g., on, adjacent, or proximate) an interface between the first ring body 104A and the second ring body 104B (e.g., at or between the second end 120 and the first end 134). The first ring body 104A and the second ring body 104B are positioned with a desired relative circumferential position of the lubrication passages 126 and/or the lubrication grooves 132 and the lubrication passages 142 and/or the lubrication grooves 148. The shaft 204 may additionally include a nut 260 configured to locate and securely retain the inner ring 104 on the shaft 204. For example, the nut 260 may be threaded onto the shaft 204 to fix a position of the inner ring 104 on the shaft 204. The nut 260 may be disposed at (e.g., on, adjacent, or proximate) and/or within the second opening 232. The nut 260 may contact the first housing body 224 and/or the second housing body 226 at (e.g., on, adjacent, or proximate) the second opening 232.

The motor 206 is operably connected to the shaft 204 to drive rotation of the shaft 204 about the axis 222. For example, the motor 206 may be coupled with the shaft 204 (e.g., the first end 242) by an output shaft 262. The motor 206 may be configured, for example, as an electric motor. The present disclosure, however, is not limited to any particular configuration of the motor 206 provided the motor 206 is configured to effect rotation of the shaft 204 at a rotation speed at or comparable to an expected rotation speed (or range of expected rotation speeds) for the inner ring 104 during operation of rotational equipment (e.g., a gas turbine engine) including the bearing 102 and its inner ring 104.

The lubricant injection sub-assembly 208 is configured to direct a lubricant (e.g., oil) at (e.g., on, adjacent, or proximate) the shaft 204. For example, the lubricant injection sub-assembly 208 may be configured to direct one or more lubricant streams 264 through the second opening 232 and the opening 252, and into the internal cavity 250. The lubricant injection sub-assembly 208 may include, for example, a lubricant pump and one or more lubricant nozzles configured to form the lubricant streams 264 and direct the lubricant streams 264 to the shaft 204. The present disclosure, however, is not limited to any particular configuration of the lubricant injection sub-assembly 208.

The lubricant collection sub-assembly 210 is configured to collect and store the lubricant which has passed through the shaft 204, the inner ring 104, the lubricant channels 236, and the outlets 240. FIG. 6 illustrates an exemplary lubricant flow path 266 of the lubricant to the lubricant collection sub-assembly 210. The lubricant collection sub-system 210 is connected in fluid communication with the outlets 240, 240A-C. The lubricant collection sub-system 210 of FIG. 6 includes a plurality of lubricant collection tanks 268, with each of the lubricant collection tanks 268 connected in fluid communication with a respective one of the outlets 240, 240A-C. For example, the lubricant collection tanks 268 may include a first lubricant collection tank 268A connected (e.g., directly connected) in fluid communication with the first outlet 240A by a first conduit 270A, a second lubricant collection tank 268B connected (e.g., directly connected) in fluid communication with the second outlet 240B by a second conduit 270B, and a third lubricant collection tank 268C connected (e.g., directly connected) in fluid communication with the third outlet 240C by a third conduit 270C. The present disclosure, however, is not limited to the foregoing exemplary configuration of the lubricant collection sub-assembly 210 shown in FIG. 6. As an example, the lubricant collection sub-assembly 210 may alternatively be configured to measure an amount of lubricant flowing through each of the conduits 270A-C. Accordingly, the conduits 270A-C may be connected in fluid communication with a same lubricant collection tank.

The lubrication test assembly 200 may further include the lubricant separation disks 212 to further form and separate (e.g., axially separate) the plurality of lubricant channels 236. For example, the lubricant separation disks 212 may be axially distributed within the bearing cavity 228, similar to the lubricant separation walls 234, to further form and separate (e.g., axially separate) the plurality of lubricant channels 236. Each of the lubricant separation disks 212 may be configured as an annular body extending circumferentially about (e.g., completely around) the axis 222. Each of the lubricant separation disks 212 may extend radially from the shaft 204 and/or the inner ring 104 to a position at (e.g., on, adjacent, or proximate) the distal end 238 of a respective one of the lubricant separation walls 234. The lubricant separation disks 212 may include inner lubricant separation disks 272 and outer lubricant separation disks 274. The inner lubricant separation disks 272 may be disposed in contact with the inner ring 104 (e.g., the first ring body 104A and the second ring body 104B) at (e.g., on, adjacent, or proximate) the roller element groove 150. For example, the inner lubricant separation disks 272 may include a first inner lubricant separation disk 272A and a second inner lubricant separation disk 272B. The first inner lubricant separation disk 272A may extend between the first ring body 104A and the second lubricant separation wall 234B. The second inner lubricant separation disk 272B may extend between the second ring body 104B and the third lubricant separation wall 234C. The outer lubricant separation disks 274 may be disposed in contact with the axial ends of the inner ring 104 (e.g., the first end 118 and the second end 136). The outer lubricant separation disks 274 may include a first outer lubricant separation disk 274A and a second outer lubricant separation disk 274B. The first outer lubricant separation disk 274A may be disposed radially coincident with the first end 118 and may extend between the first end 118 and the first lubricant separation wall 234A. The second outer lubricant separation disk 274B may be disposed radially coincident with the second end 136 and may extend between the second end 136 and the fourth lubricant separation wall 234D. The lubricant separation disks 212 may be installed on and/or mounted to the shaft 204 and the inner ring 104 and the lubricant separation disks 212 may be rotatable with the shaft 204 and the inner ring 104 about the axis 222.

Figure 7:
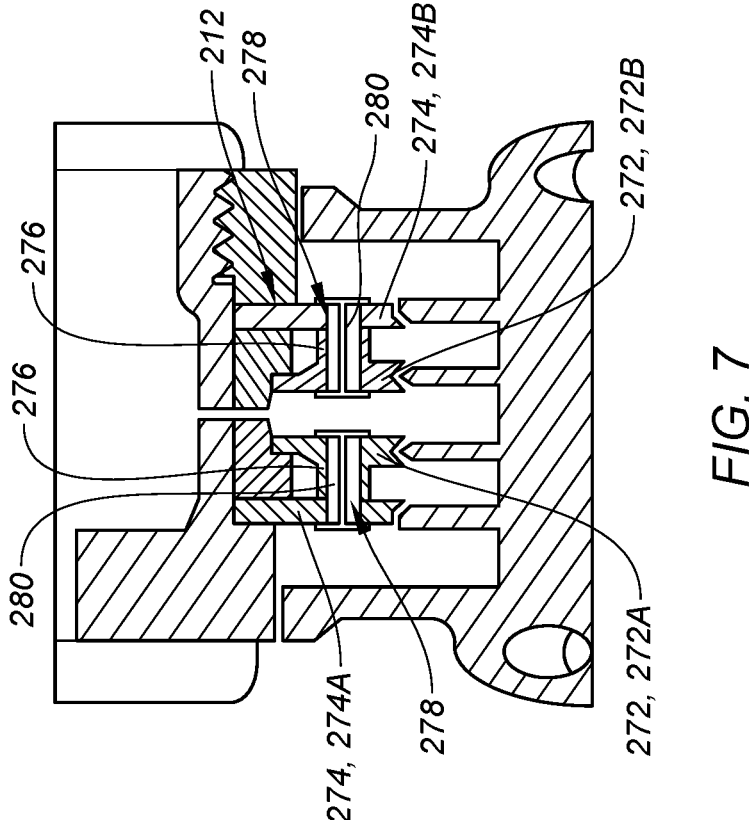
FIG. 7 illustrates a side, cutaway view of another lubrication test assembly, in accordance with one or more embodiments of the present disclosure.

Referring to FIG. 7, in some embodiments, each of the inner lubricant separation disks 272 may be connected to an axially adjacent one of the outer lubricant separation disks 274, to facilitate secure positioning of the lubricant separation disks 212 on the shaft 204 and the inner ring 104. For example, the first inner lubricant separation disk 272A may be connected to the first outer lubricant separation disk 274A and the second inner lubricant separation disk 272B may be connected to the second outer lubricant separation disk 274B. As shown in FIG. 7, each of the inner lubricant separation disks 272 may include a plurality of hollow tube bodies 276 extending axially toward and contacting the respective axially adjacent one of the outer lubricant separation disks 272. The respective axially adjacent one of the outer lubricant separation disks 274 may include a plurality of apertures 278, with each of the apertures 278 aligned with a respective one of the hollow tube bodies 276. Alternatively, the inner lubricant separation disks 272 may include the apertures 278 and the outer lubrication separation disks 274 may include the hollow tube bodies 276. The lubricant separation disks 212 may further include a plurality of mechanical fasteners 280 (e.g., a bolt and threaded nut), with each of the mechanical fasteners 280 extending through a respective one of the pairs of hollow tube bodies 276 and apertures 278 to securely retain each of the inner lubricant separation disks 272 and the respective axially adjacent one of the outer lubricant separation disks 274 together. In some embodiments, the lubricant separation walls 234 may alternatively extend to the shaft 204 and/or the inner ring 104 and the lubricant separation disks 212 may not be used.

Figure 8:
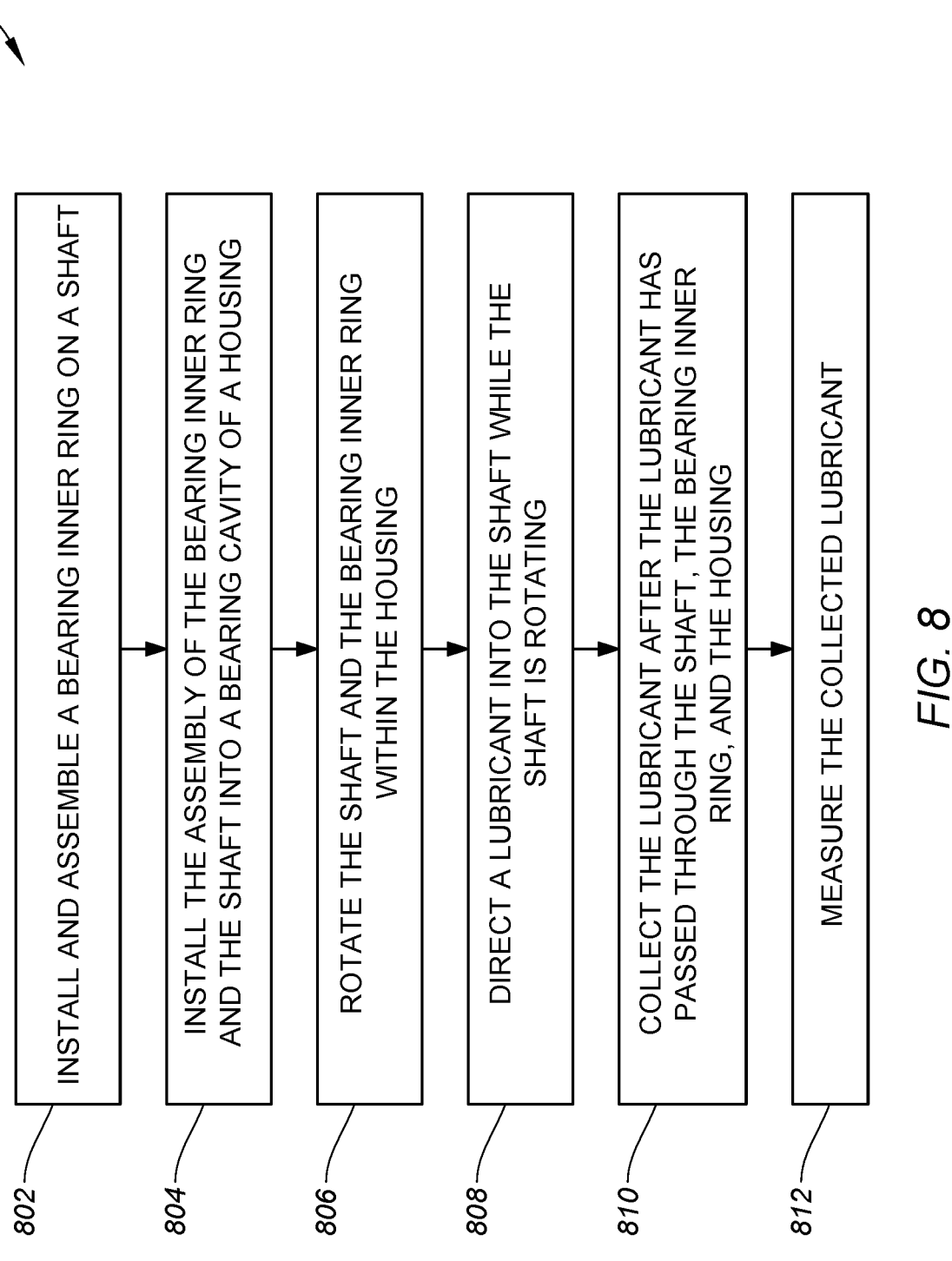
FIG. 8 illustrates a flow chart depicting a method for measuring lubricant flow of a bearing inner ring using a lubrication test assembly, in accordance with one or more embodiments of the present disclosure.

Referring to FIG. 8, with continued reference to FIGS. 6 and 7, a method 800 for measuring lubricant flow of a bearing inner ring using a lubrication test assembly (e.g., the lubrication test assembly 200) is provided. FIG. 8 illustrates a flowchart for the Method 800. The Method 800 will be described herein with respect to the inner ring 104 and the lubrication test assembly 200. However, it should be understood that the method 800 is not limited to use with the inner ring 104 or the lubrication test assembly 200 described herein. Unless otherwise noted herein, it should be understood that the steps of method 800 are not required to be performed in the specific sequence in which they are discussed below and, in some embodiments, the steps of the method 800 may be performed separately or simultaneously.

Step 802 includes installing and assembling the inner ring 104 on the shaft 204 (e.g., with the shaft 204 removed from the housing 202). For example, the first ring body 104A may be installed on the shaft 204 followed by the second ring body 104B disposed axially at (e.g., on, adjacent, or proximate) the first ring body 104A. The first ring body 104A and the second ring body 104B may be installed on the shaft 204 with the passage outlet 258 of each of the lubrication passages 254 disposed at (e.g., on, adjacent, or proximate) the interface between the first ring body 104A and the second ring body 104B. Subsequently, the nut 260 may be installed on (e.g., threaded onto) the shaft 204 to locate and securely retain the inner ring 104 on the shaft 204. In embodiments of the lubrication test assembly 200 including the lubricant separation disks 212, the inner ring 104 and the lubricant separation disks 212 may be installed together on the shaft 204 in sequence. For example, the first outer lubricant separation disk 274A may be installed on the shaft 204 followed by the first ring body 104A. Subsequently, the first inner lubricant separation disk 272A and the second inner lubricant separation disk 272B may be installed on the shaft 204, with the first inner lubricant separation disk 272A positioned onto the first ring body 104A. The second ring body 104B may be installed on the shaft 204 axially at (e.g., on, adjacent, or proximate) the first ring body 104A. The second inner lubricant separation disk 272B may be repositioned onto the second ring body 104B. The second outer lubricant separation disk 274B may be installed on the shaft 204 followed by the nut 260 to locate and securely retain the inner ring 104 and the outer lubricant separation disks 274 on the shaft 204. The mechanical fasteners may subsequently be installed on the inner lubricant separation disks 272 and the outer lubricant separation disks 274 to locate and securely retain the inner lubricant separation disks 272 on the inner ring 104. The present disclosure, however, is not limited to the foregoing exemplary sequences for installing and assembling components of the inner ring 104 and the lubrication test assembly 200.

Step 804 includes installing the assembly (see step 802 and FIG. 6) of the shaft 204, the inner ring 104, and (e.g., optionally) the lubricant separation disks 212 in bearing cavity 228 of the housing 202 (e.g., with the second housing body 226 initially removed). With this assembly installed in the bearing cavity 228, as described above and shown in FIG. 6, the housing 202 (e.g., the lubricant separation walls 234 and/or the lubricant separation disks 212 form the discrete and separated lubricant channels 236. The second housing body 226 may subsequently be installed on and/or mounted to the first housing body 224 to enclose the bearing cavity 228.

Step 806 includes driving rotation of the shaft 204 and the inner ring 104 about the axis 222 with the motor 206. Step 808 includes directing a lubricant (e.g., the lubricant streams 264) into the shaft 204 (e.g., the internal cavity 250) with the lubricant injection sub-assembly 208. Rotation of the shaft 204 and the inner ring 104 about the axis 222 causes the lubricant within the internal cavity 250 to flow through the lubrication passages 254 and to subsequently flow between the first ring body 104A and the second ring body 104B, through the lubrication passages 126, and/or through the lubrication passages 142, for example, along the lubricant flow path 266. The lubricant flowing between the first ring body 104A and the second ring body 104B, through the lubrication passages 126, and/or through the lubrication passages 142 subsequently flows into and through the lubricant channels 236, 236A-C to the outlets 240, 240A-C. Step 810 includes collecting the lubricant from the outlets 240, 240A-C with the lubricant collection sub-assembly 210. As shown in FIG. 6, for example, the lubricant flowing through the lubrication passages 126 may be directed into the first lubricant collection tank 268A, the lubricant flowing between the first ring body 104A and the second ring body 104B may be directed into the second lubricant collection tank 268B, and the lubricant flowing through the lubrication passages 142 may be directed into the third lubricant collection tank 268C. Step 812 includes measuring the lubricant in each of the lubricant collection tanks 268 to determine a proportion of the total lubricant directed into and through the inner ring 104 which flows between the first ring body 104A and the second ring body 104B, through the lubrication passages 126, and/or through the lubrication passages 142, to identify lubricant flow characteristics of the inner ring 104 and its relative circumferential positions of the lubrication passages 126 and/or the lubrication grooves 132 and the lubrication passages 142 and/or the lubrication grooves 148.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A lubrication test assembly comprising:
   a housing, the housing includes a first body portion and a second body portion, the first body portion and the second body portion form a bearing cavity, the first body portion and the second body portion form a first housing opening and a second housing opening of the bearing cavity, the first housing opening and the second housing opening are disposed at an axis, the first body portion and the second body portion form a plurality of axially distributed lubricant separation walls, the axially distributed lubricant separation walls form and separate a plurality of lubricant channels within the bearing cavity, and the first body portion forms a plurality of outlets with each outlet of the plurality of outlets disposed at a respective lubricant channel of the plurality of lubricant channels; and a shaft disposed in the bearing cavity and configured for rotation about the axis, the shaft includes an outer radial side and an inner radial side, and the inner radial side surrounds and forms an internal cavity, the internal cavity includes a shaft opening, and the shaft opening is disposed at the second housing opening.

2. The lubrication test assembly of claim 1, wherein the shaft extends between and to a first axial shaft end and a second axial shaft end, the first axial shaft end is disposed at the first housing opening, and the second axial shaft end is disposed at the second housing opening.

3. The lubrication test assembly of claim 1, further comprising a motor operably connected to the shaft, and the motor is configured to drive rotation of the shaft about the axis.

4. The lubrication test assembly of claim 1, wherein the shaft further forms a plurality of shaft lubrication passages, and the plurality of shaft lubrication passages extend between and to the internal cavity and the outer radial side.

5. The lubrication test assembly of claim 4, further comprising a lubricant injection sub-assembly configured to direct one or more lubricant streams into the internal cavity through the shaft opening and the second housing opening.

6. The lubrication test assembly of claim 1, further comprising a lubricant collection sub-assembly connected in fluid communication with the plurality of outlets.

7. The lubrication test assembly of claim 1, further comprising a plurality of lubricant separation disks, each lubricant separation disk of the plurality of lubricant separation disks extends radially between the shaft and a respective lubricant separation wall of the plurality of lubricant separation walls to further form the plurality of lubricant channels within the bearing cavity.

8. The lubrication test assembly of claim 7, wherein the plurality of lubricant separation disks are rotationally fixed to the shaft, relative to the axis.

9. The lubrication test assembly of claim 7, wherein the plurality of lubricant separation disks includes a plurality of inner axial lubricant separation disks and a plurality of outer axial lubricant separation disks, and each inner axial lubricant separation disk of the plurality of inner axial lubricant separation disks is connected to a respective outer axial lubricant separation disk of the plurality of outer axial lubricant separation disks.

10. The lubrication test assembly of claim 1, wherein each lubricant channel of the plurality of lubricant channels extends circumferentially about the axis.

11. A method for measuring lubricant flow of a bearing inner ring using a lubrication test assembly, the method comprising:

installing an inner ring of a bearing on a shaft, the shaft includes an outer radial side and an inner radial side, the inner radial side surrounds and forms an internal cavity and a shaft opening of the internal cavity, the shaft further forms a plurality of shaft lubrication passages, the plurality of shaft lubrication passages extend between and to the internal cavity and the outer radial side, and the inner ring is disposed on the outer radial side at the plurality of shaft lubrication passages;

installing the shaft and the inner ring into a bearing cavity of a housing to form a plurality of separated lubricant channels within the bearing cavity, and the housing forms a plurality of outlets with each outlet of the plurality of outlets disposed at a respective lubricant channel of the plurality of separated lubricant channels;

rotating the shaft and the inner ring, within the bearing cavity, about an axis;

directing a lubricant into the internal cavity, while the shaft and the inner ring are rotating, to direct the lubricant through the plurality of shaft lubrication passages, through the inner ring, through the plurality of separated lubricant channels, to the plurality of outlets;

separately collecting the lubricant from each outlet of the plurality of outlets; and separately measuring the lubricant collected from each outlet of the plurality of outlets.

12. The method of claim 11, wherein separately collecting the lubricant from each outlet of the plurality of outlets includes collecting the lubricant from each outlet of the plurality of outlets with a lubricant collection sub-assembly, the lubricant collection sub-assembly includes a plurality of lubricant collection tanks, a first lubricant collection tank of the plurality of lubricant collection tanks is connected in fluid communication with a first outlet of the plurality of outlets and a second lubricant collection tank of the plurality of lubricant collection tanks is connected in fluid communication with a second outlet of the plurality of outlets.

13. The method of claim 11, wherein the inner ring includes a first ring body and a second ring body, and installing the inner ring on the shaft includes positioning an interface of the first ring body and the second ring body at the plurality of shaft lubrication passages.

14. The method of claim 13, wherein the first ring body includes a first plurality of ring lubricant passages, the second ring body includes a second plurality of ring lubricant passages, a first lubricant channel of the plurality of separated lubricant channels is connected in fluid communication with the first plurality of ring lubricant passages, a second lubricant channel of the plurality of separated lubricant channels is connected in fluid communication with the second plurality of ring lubricant passages, and a third lubricant channel of the plurality of separated lubricant channels is connected in fluid communication with the interface of the first ring body and the second ring body.

15. The method of claim 11, wherein installing the inner ring on the shaft further includes installing a plurality of lubrication separator disks on the inner ring and the shaft, and the plurality of lubrication separator disks further form the plurality of separated lubricant channels.

16. An assembly comprising:

a housing, the housing forms a bearing cavity, the housing further forms a first housing opening and a second housing opening of the bearing cavity along an axis, the housing includes a plurality of axially distributed lubricant separation walls, the plurality of axially distributed lubricant separation walls form and separate a plurality of lubricant channels within the bearing cavity, and the housing further forms a plurality of outlets with each outlet of the plurality of outlets disposed at a respective lubricant channel of the plurality of lubricant channels;

a shaft disposed in the bearing cavity and configured for rotation about the axis, the shaft includes an outer radial side and an inner radial side, the inner radial side surrounds and forms an internal cavity, the internal cavity includes a shaft opening, the shaft opening is disposed at the second housing opening, the shaft extends between and to first axial shaft end and a second axial shaft end, the first axial shaft end is disposed at the first housing opening, the second axial shaft end is disposed at the second housing opening, the second axial shaft end forms the shaft opening, and the shaft further forms a plurality of shaft lubrication passages extending between and to the internal cavity and the outer radial side; and a bearing inner ring mounted on the outer radial side at the plurality of shaft lubrication passages, the bearing inner ring includes a first plurality of ring lubricant passages and a second plurality of ring lubricant passages, the first plurality of ring lubricant passages is connected in fluid communication with a first lubricant channel of the plurality of lubricant channels, and the second plurality of ring lubricant passages is connected in fluid communication with a second lubricant channel of the plurality of lubricant channels.

17. The assembly of claim 16, wherein the bearing inner ring extends between and to an outer radial ring side and an inner radial ring side, and the bearing inner ring forms a roller element groove at the outer radial side.

18. The assembly of claim 17, wherein the bearing inner ring includes a first ring body and a second ring body, the first ring body is disposed axially adjacent the first ring body at an interface, and the first ring body and the second ring body form the roller element groove at the interface.

19. The assembly of claim 18, wherein the interface is connected in fluid communication with a third lubricant channel of the plurality of lubricant channels.

20. The assembly of claim 16, further comprising a lubricant collection sub-assembly connected in fluid communication with the plurality of outlets, the lubricant collection sub-assembly includes a plurality of lubricant collection tanks, and each lubricant collection tank of the plurality of lubricant collection tanks is connected in fluid communication with a respective outlet of the plurality of outlets.

* * * * *